United States Patent [19]
Sutherland et al.

[11] 3,778,084
[45] Dec. 11, 1973

[54] CRASH RESTRAINT MATRIX INFLATION SYSTEM

[75] Inventors: George S. Sutherland, Mercer Island; Randel L. Hoskins, Woodinville, both of Wash.

[73] Assignee: Rocket Research Corporation, Redmond, Wash.

[22] Filed: June 14, 1971

[21] Appl. No.: 152,627

[52] U.S. Cl. ........... 280/150 AB, 23/281, 102/37.7, 102/39, 102/102, 149/2
[51] Int. Cl. .......................................... B60r 21/08
[58] Field of Search ................ 280/150 AB; 149/2, 149/6, 7, 19; 102/102, 104, 98, 39, 40; 23/281

[56] References Cited
UNITED STATES PATENTS

| | | | |
|---|---|---|---|
| 147,871 | 2/1874 | Shaw | 102/40 |
| 2,916,996 | 12/1959 | Coffee | 102/104 |
| 3,190,776 | 6/1965 | Ender | 149/8 |
| 3,450,414 | 6/1969 | Kobori | 280/150 AB |
| 3,532,360 | 10/1970 | Leising et al. | 280/150 AB |
| 3,606,377 | 9/1971 | Martin | 280/150 AB |
| 3,636,882 | 1/1972 | Aaronson et al. | 102/104 |

Primary Examiner—Kenneth H. Betts
Assistant Examiner—John P. Silverstrim
Attorney—John O. Graybeal et al.

[57] ABSTRACT

A crash restraint device for an automobile comprising an inflatable bag mounted forward of the automobile passenger seat, which inflates upon crash impact. A bag inflating device comprising a matrix of a first composition which produces a higher temperature gas product, interspersed with increments of a second composition which endothermically produce a gas product of a lower temperature, with the resulting gas mixture being used to inflate the bag.

In one embodiment coolant gas producing particles are arranged in an interconnected matrix of an exothermically reacting gas producing composition. In a second embodiment there is a plurality of capsules, each having an interior of a vaporizing coolant material and a coating of an exothermically reacting composition. In a third embodiment there is a mixture of coolant particles and exothermically reacting gas producing particles.

4 Claims, 6 Drawing Figures

PATENTED DEC 11 1973 3,778,084
SHEET 1 OF 2

INVENTORS,
GEORGE S. SUTHERLAND
RANDEL L. HOSKINS
BY
Graybeal Cole & Barnard
ATTORNEYS

CRASH RESTRAINT MATRIX INFLATION SYSTEM

BACKGROUND OF THE INVENTION

1. Field of the Invention

This invention relates to a crash restraint device in which a bag is inflated to prevent a passenger in an automobile from being thrown violently against the steering wheel, dashboard or other automobile structure, and more particularly to an improved method and apparatus of inflating the bag.

2. Description of the Prior Art

There are in the prior art devices which cause a protective bag to inflate in front of a driver or passenger to cushion him from impact with the steering wheel, dashboard, or other vehicle structure. Usually the device is activated by an inertial switch responsive to a crash impact of the automobile. This inertial switch in turn causes an inflating device to quickly inflate the collapsed bag into its inflated position deployed in front of the driver or passenger. The inflating gas is generally supplied from a source of compressed gas or from gas produced by a chemical reaction.

A major consideration with storing a collapsed bag and then inflating it so that it is deployed to act as a cushion for the passenger or driver is the extremely short period of time (in the order of 20 milliseconds) that the deployment of the inflated bag must take place to be able to act as an effective cushion in the crush situation. Normally to react a chemical composition to produce combustion gases which are able to inflate a bag in this short period of time requires a reaction of sufficient heat intensity that the inflating gases are sufficiently hot either to cause the bag to decompose, or in the event the bag ruptures, to harm the occupants of the vehicle. Hence, the prior art has used various devices for cooling the combustion gas and then using it for inflating a crash restraint bag.

For example, Kabori U.S. Pat. No. 3,450,414 places a charge of black powder in a cartridge which in turn is disposed within a chamber of a cooling liquid and explodes the powder to vaporize the liquid. Teague et al, U.S. Pat. No. 3,532,392 discloses a device where there are several charges of black powder that are ignited sequentially, and the combustion gases therefrom pass through a sublimable, vaporizable, or decomposable material capable of absorbing heat, which materail is disposed in a layer above the charges of black powder.

Also in the prior art there have been attempts to produce chemical compositions which themselves produce a gaseous product of lower temperature for various purposes. Typical of these are Vriesen U.S. Pat. No. 3,214,304; Butts U.S. Pat. No. 3,473,981; and Sutton U.S. Reissue Pat. No. 26,468. However, the problem with such attempts is that either the reaction products have too high a temperature, and/or the reaction proceeds too slowly to supply the inflating gases at a sufficient rate to inflate a crash restraint bag quickly enough.

Also there are in the prior art various propellant compositions to provide a gaseous discharge where the separate reacting ingredients are arranged in separate cells, or in a matrix. The reason for this usually is to separate the several ingredients from one another because of incompatibility, or to avoid premature chemical reaction, etc. Typical of such propellant compositions are Long U.S. Pat. No. 3,035,950; Colpitts U.S. Pat. No. 2,960,935; Orsion U.S. Pat. No. 2,802,332; Ender U.S. Pat. No. 3,190,776; Sauer et al, U.S. Pat. No. 3,194,851; Gustavson U.S. Pat. No. 3,204,560; Morris U.S. Pat. No. 3,373,062; Berman U.S. Pat. No. 3,143,446; Mulloy U.S. Pat. No. 3,191,535; Hodgson U.S. Pat. No. 3,377,955, and Rudy et al, U.S. Pat. No. 3,480,488.

SUMMARY OF THE INVENTION

In the present invention there is a collapsed inflatable (i.e. bag) so disposed in an automotive vehicle that upon being inflated the bag is positioned between automobile structure and the location of an occupant so as to provide a protective cushion. The inflating mechanism for the bag comprises a gas generating device containing a first composition which reacts exothermically to produce a first higher temperature gas product and a second composition which upon being heated endothermically releases a second lower temperature gas product. Rather than mixing the two compositions in a intimate mixture, in the present invention, the first reacting composition is arranged in a matrix made up of increments having a sufficient quantity of the first composition that enough heat is generated at the location of the individual increment to sustain reaction of that individual increment. Further, the first composition increments are disposed in sufficient proximity to one another that the heat from the reaction of one increment generates heat to cause reaction of a second proximate increment whereby the reaction proceeds through the first composition matrix. The second composition is also arranged in increments distributed through the first composition matrix and in sufficient proximity to the first composition increments that the heat from the reaction of the first composition causes the second composition increments to produce a lower temperature gas product, with the resulting gas mixture of the two compositions being at a sufficiently low temperature for use as an inflating gas in the crash restraint system.

In one embodiment there is an interconnecting matrix of the first composition, with particles or capsules of the second cooling composition distributed throughout.

In a second embodiment this is accomplished by providing a plurality of capsules, each having a core of the second cooling composition and a coating of the exothermically reacting first composition.

In a third embodiment the first composition matrix is accomplished by arranging the first composition in loose particulate form with increments of the second composition coolant being distributed throughout.

DESCRIPTION OF THE PREFERRED EMBODIMENTS

Figure 1:
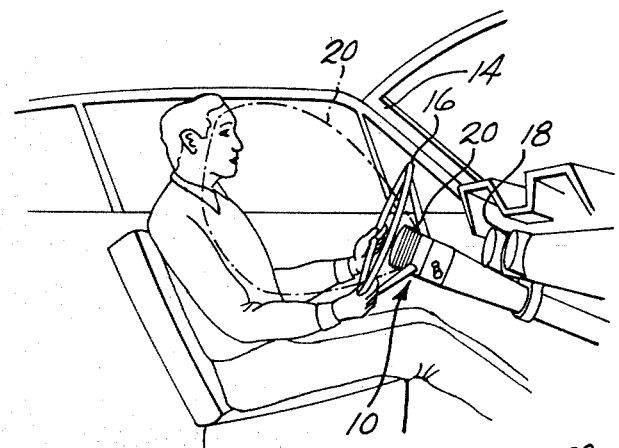
FIG. 1 is a side elevational view showing the overall crash restraint system of the present invention.

With reference to FIG. 1, the crash restraint apparatus 10 of the present invention is shown mounted on a steering column 12 of an automobile 14 having a steering wheel 16 and dashboard 18. The apparatus 10 comprises an inflatable bag 20 which in FIG. 1 is shown in full lines in its collapsed position, and in dotted lines in its inflated position. The bag 20 is attached to a circular mounting structure 22 within which is housed a gas generating unit 24 having a pressure vessel 25 which communicates with the interior of bag 20 through a plurality of ports 26. The ports 26 are closed by respective burst discs 28 which open upon pressurization of the gas generating chamber 30 of the unit 24. At the rearward end of the unit 24 (i.e., that end nearest the passenger) is a suitable igniter 32.

The gas producing combination 34 of the present invention is located in the gas producing chamber 30 defined by the pressure vessel 25 of the unit 24. This gas producing combination 34 comprises a first composition which functions to react exothermically to produce a gas product of a relatively high temperature. Candidates for such a composition include black powder, N-5 (which is nitrocellulose 50 percent, nitroglycerin 34.9 percent, diethylphthalate 10.5 percent, 2-nitrodiphenylamine 2.0 percent, lead salicylate 1.2 percent, lead 2-ethylhexoate 1.2 percent, and candelilla wax 0.2 percent), ACC-10 (which is nitrocellulose 40–50 percent, nitroglycerin 30–40 percent, di-normal propyladipate 1–5 percent, 2-nitrodiphenylamine 2 percent, ethyl centralite 0.5–2 percent, cupric betaresorcylate 1.0–3.0 percent, ABF burning rate modifier 3–4 percent), and HPC-95. This composition is formed in an interconnected matrix 36 in the chamber 30.

A second composition of the gas producing combination is one which, upon being heated, endothermically releases a gas product at a relatively low temperature. This could be a solid composition, such as: $NH_4HCO_3$; $CaO_2 \cdot 8H_2O$; or $Na_2SO_4 \cdot 10 H_2O$. Alternately it could be a liquid coolant such as Freon 113 (trichlorotrifluoroethane) or water. If a liquid composition is used, it would ordinarily be encapsulated in, for example, a wax casing or other containing film. The second composition is disposed as units or increment 38 dispersed uniformly throughout the matrix 36 of the first composition.

To describe the operation of the gas producing combination 34, the first composition matrix 36 can be considered as comprising a group of individual increments 40 of the first composition, which increments 40 would be a portion of the first composition 36 surrounded by a cluster of second composition increments 38. The first composition increments 40 are interconnected as at 42, so that the increments 40 along with the interconnections 42 comprise a matrix 36 of the first composition. The size of the first composition increments 40 and of the interconnections 42 is sufficient so that the heat generated by the reaction of the increment 40 is sufficient to sustain the reaction and cause the reaction to travel progressively through the interconnecting portions 42 to other increments 40. Thus, upon activating the igniter 32, the first composition portion 36 near the igniter first begins to react to produce a gas product, and this reaction moves progressively through the matrix 36 to the opposite end of the matrix 36.

The increments 38 of the second composition are characterized in that they either vaporize, sublime, or decompose endothermically to produce a relatively cool gas product. As the first composition increments 40 begin burning to produce a gas product of relatively high temperature, the proximate second composition increments 38 absorb heat therefrom to either vaporize, sublime or react to produce a second gas product of a lower temperature. The result is a gas mixture from the first and second compositions which is relatively cool. The production of this gas mixture in the chamber 30 causes an increase in pressure which bursts the discs 28 to cause the gas mixture to flow out through the openings 26 to inflate the bag 20.

The size of the individual first composition increments 40 must be sufficient so that the heat generated by their reacting (i.e., burning) is not immediately dissipated into the cooling increments 38, but is sufficient to sustain reaction and transmit sufficient heat through the interconnections 42 so that the reaction moves with sufficient rapidity through the matrix 36. The reaction front of the matrix 40 will precede the full vaporization of the cooling increments 38 by a moderate extent, so that the full cooling action of the cooling increments 38 will not significantly retard the progress of the reaction front through the matrix 40. Rather, gas products generated from the reaction front of the matrix 40 will be traveling through the chamber 30 toward the nozzle 26 to cause additional vaporization of decomposition of the increments 38. If the increments 40 and 38 were made quite small and arranged in a very intimate mixture, so that the heat absorption of the increments 38 was almost instantaneous with the reaction of adjacent increments 40, then there would not be sufficient heat maintained by the increments 40 to cause the reaction to move with sufficient speed through the matrix 36.

Figure 3:
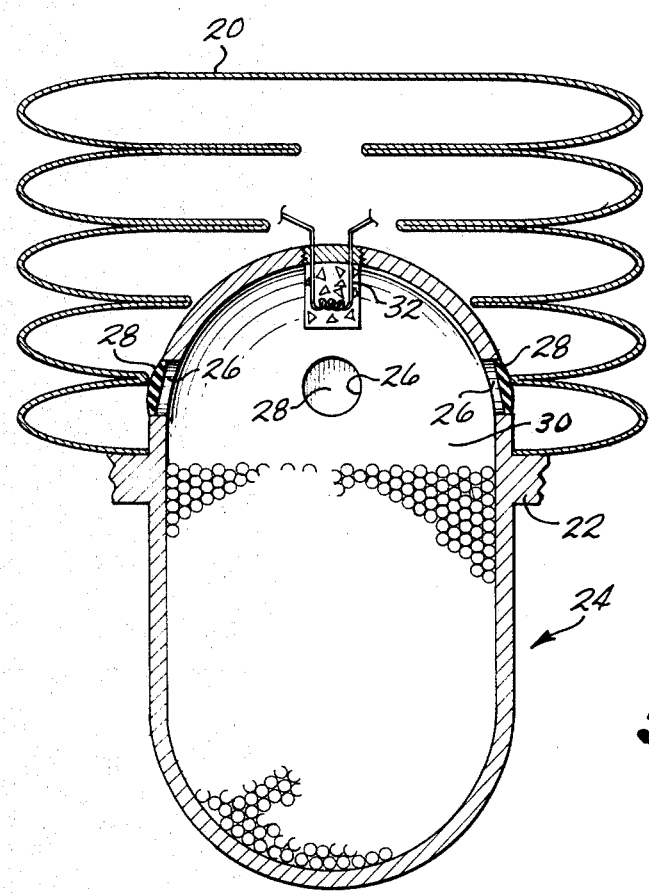
FIG. 3 is a view similar to FIG. 2, showing a second embodiment of the present invention.
Figure 4:
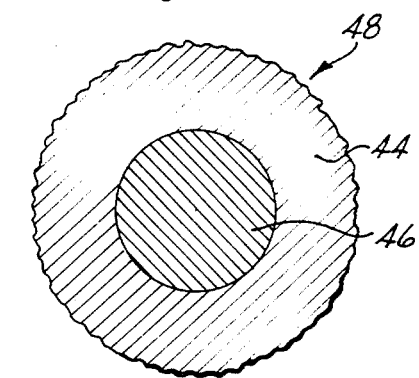
FIG. 4 shows a first form of an individual capsule of the embodiment of FIG. 3.

A second embodiment of the present invention is shown in FIG. 3. Since the gas generating unit 24, openings 26, burst disc 28, pressure vessel 25, and igniter 32 are substantially the same as in the prior embodiment, the description of these will not be repeated. The essential difference in this second embodiment is the manner in which the first and second composition are disposed in the chamber 30. With reference to FIG. 4, the exothermically reacting first composition is provided in the form of an outer layer 44 of a capsule 48. The second composition which produces a gas product endothermically is the core 46 or enclosed portion of the capsule 48. Thus, the first composition outer film 44 with the second composition core 46 provides a plurality of individual capsules 48.

The mode of operation of the second embodiment is substantially the same as in the first embodiment. It can be seen that the various capsule layers 44 of the first composition collectively form an interconnecting matrix. Thus, upon ignition a reaction front travels forwardly through this matrix made up of various layer increments 44. The reaction front travels with relative rapidity through this matrix, emitting relatively high temperature gases through the matrix toward the exit nozzles 26. As the coolant cores 46 becomes exposed, they absorb heat from the higher temperature gases to produce a lower temperature gas product, which combines with the higher temperature gas product to form a resultant relatively cool gas mixture which in turn causes inflation of the bag 20.

Figure 5:
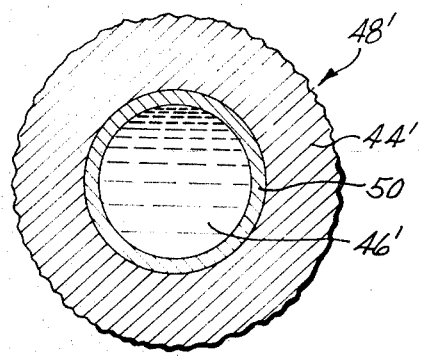
FIG. 5 shows a second form of a capsule of the embodiment of FIG. 3.

FIG. 5 shows a capsule 48' similar to the capsule 24 of FIG. 4. This capsule 48' has an encapsulating layer 44' of the first composition, and a core 46' of a liquid second composition, such as Freon. However, there is a thin encapsulating film 50 of wax or some other suitable material to contain the liquid coolant 46'. The manner in which these capsules form a matrix and react to provide a cool gas mixture is substantially the same as described above.

Figure 2:
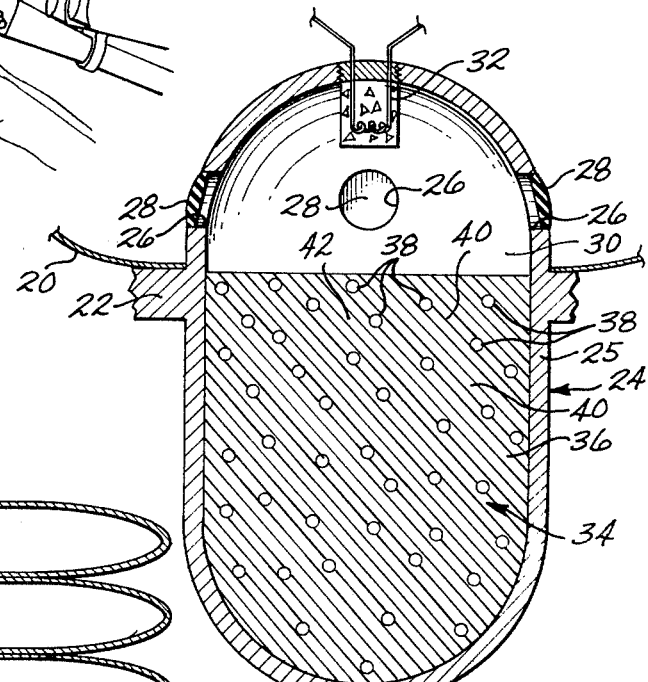
FIG. 2 is a view partially in section showing the gas generating unit of a first embodiment of the present invention.
Figure 6:
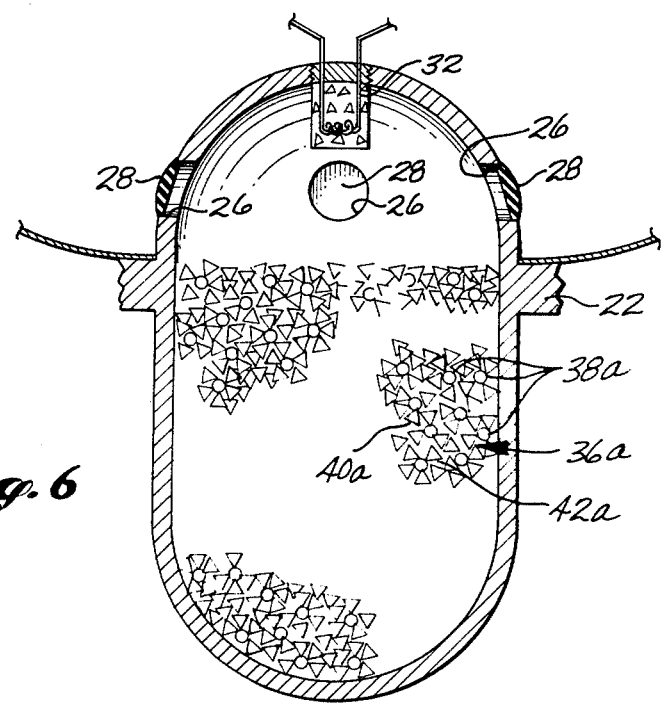
FIG. 6 is a view similar to FIGS. 2 and 3, showing a third embodiment of the present invention.

FIG. 6 shows a third embodiment wherein the second composition increments 38a are substantially the same as in the first embodiment of FIG. 2. However, instead of the first composition matrix 36a being made up of an interconnected matrix where the matrix portions are physically connected to one another, rather the first composition is disposed in the chamber 30 in granule or powdered form. (For illustration purposes, these are shown as small triangular particles.) However, the mode of operation is substantially the same as in the first and second embodiments. The various increments 40a and interconnecting portions 42a cause the reaction of the first composition to travel rapidly through the matrix 36a. The second composition increments 38a absorb heat and supply additional gas product of a relatively low temperature as described previously.

EXAMPLE NO. 1

To demonstrate operability of the present invention, a plurality of water capsules (a drop of water encapsulated in a thin film of wax) was mixed with black powder, and this was placed in a pressure chamber 1.5 inches long and ½ inch wide. There were 0.85 gram of black powder and 1.0 gram of encapsulated water. This combination was ignited by 0.005 inch diameter Pyrofuse wire supplied by Sigmund Cohn Co. and there was substantially complete combustion in about 30 milliseconds. The resulting gas mixture consisted of 7.3 percent $N_2$, 11.3 percent $CO_2$, 8.7 percent $H_2S$, 1.8 percent $H_2$ and 64 percent $H_2O$ by weight.

EXAMPLE NO. 2

Substantially the same procedure was followed as in Example 1, and 32 mesh black powder (0.85 gram) was mixed with $Na_2SO_4 \cdot 10H_2O$ (0.45 gram) which has an average particle size of 60 mesh. This was ignited by 0.005 inch diameter Pyrofuse wire supplied by Sigmund Cohn Co. and burned for 30 milliseconds to produce a relatively cool gas mixture.

What is claimed is:

1. In an occupant carrying vehicle having an occupant carrying location and structure spaced from the location, a crash restraint system for protecting an occupant in said location from impact with said structure, said system comprising:
   a. a collapsed inflatable so disposed and mounted in said vehicle that upon being inflated the inflatable is positioned between said structure and said occupant carrying location,
   b. an inflating unit having a gas generating chamber and an outlet to direct inflating gas into said bag; and
   c. a gas producing combination in said chamber, said combination comprising:

1. a first composition which reacts exothermically to produce a first higher temperature gas product,
   2. a second composition which, upon being heated, endothermically releases a second lower temperature gas product,
   3. said first composition being arranged in a matrix, said matrix being made up of increments with the individual increments having a sufficient quantity of the first composition that enough heat is generated at the location of the individual increments to sustain reaction of the individual increments,
   4. the individual increments of the first composition being so disposed in sufficient interconnecting proximity to one another that reaction of one proximate increment generates heat to cause reaction of a second proximate increment, whereby reaction of said first composition proceeds progressively through said matrix with relative rapidity to produce said first gas product,
   5. the second composition being arranged in increments distributed through the first composition matrix and in sufficient proximity to said first composition increments whereby as the reaction of the first composition proceeds through said matrix, said second composition becomes heated thereby to produce said second gas product to provide a relatively cool gas mixture of said first and second gas product, and
   6. said first and second compositions being arranged in capsules, each capsule having a center portion made up of the second composition, and an encapsulating film made up of the first composition, whereby the encapsulating film of the capsules being in contact with each other substantially forms said matrix.

2. A gas producing combination adapted to inflate an inflatable such as a crash restraint inflatable, said gas producing combination comprising:
   a. a first composition which reacts exothermically to produce a first higher temperature gas product,
   b. a second composition which, upon being heated, endothermically releases a second lower temperature gas product,
   c. said first composition being arranged in a matrix, said matrix being made up of increments with the individual increments having a sufficient quantity of the first composition that enough heat is generated at the location of the individual increments to sustain reaction of the individual increment,
   d. the individual increments of the first composition being so disposed in sufficient interconnecting proximity to one another that reaction of one proximate increment generates heat to cause reaction of a second proximate increment, whereby reaction of said first composition proceeds progressively through said matrix with relative rapidity to produce said first gas product,
   e. the second composition being arranged in increments distributed through the first composition matrix and in sufficient proximity to said first composition increments whereby as the reaction of the first composition proceeds through said matrix, said second composition becomes heated thereby to produce said second gas product to provide a relatively cool gas mixture of said first and second gas product, and f. said first and second compositions being arranged in capsules, each capsule having a center portion made up of the second composition, and an encapsulating film made up of the first composition, whereby the encapsulating film of the capsules being in contact with each other substantially forms said matrix.

3. The system as recited in claim 1, wherein said second composition capsule cores comprises a vaporizing liquid in a containing film.

4. The system as recited in claim 1, wherein said capsule cores comprises a solid second composition coolant.

* * * * *